United States Patent
Nakagawa et al.

(10) Patent No.: US 6,773,340 B2
(45) Date of Patent: Aug. 10, 2004

(54) AIR-CONDITIONING DUCT FOR VEHICLE

(75) Inventors: Nobuya Nakagawa, Aichi (JP); Hajime Izumi, Takasago (JP); Tetsuo Tominaga, Takasago (JP); Toshihisa Kondo, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/379,905

(22) Filed: Mar. 6, 2003

(65) Prior Publication Data

US 2003/0176159 A1 Sep. 18, 2003

Related U.S. Application Data

(63) Continuation of application No. PCT/JP02/07449, filed on Jul. 23, 2002.

(30) Foreign Application Priority Data

Jul. 23, 2001 (JP) ........................................ 2001-221232

(51) Int. Cl.[7] ............................................... B60H 1/26
(52) U.S. Cl. ......................... 454/144; 138/39; 138/115; 138/173; 296/208
(58) Field of Search ........................... 454/144; 138/39, 138/115, 117, 172, 173; 296/208

(56) References Cited

U.S. PATENT DOCUMENTS

| 2,882,809 A | * | 4/1959 | Nelson ........................ 454/144 |
| 5,052,283 A | * | 10/1991 | Altus ........................... 454/144 |
| 5,531,484 A | * | 7/1996 | Kawano ..................... 285/179.2 |
| 5,839,293 A | * | 11/1998 | Teitelbaum et al. ............ 62/244 |
| 5,865,243 A | * | 2/1999 | Kato et al. ................... 165/153 |
| 6,582,011 B2 | * | 6/2003 | Palazzolo et al. ........... 296/208 |

FOREIGN PATENT DOCUMENTS

| JP | 4-159120 | | 6/1992 |
| JP | 7-63461 | * | 3/1995 |
| JP | 2001-310615 | | 11/2001 |
| JP | 2002-1801 | | 1/2002 |

* cited by examiner

*Primary Examiner*—Harold Joyce
(74) *Attorney, Agent, or Firm*—Wenderoth, Lind & Ponack, L.L.P.

(57) ABSTRACT

A vehicle air-conditioning duct 1 has an oblong cross-sectional configuration. The air-conditioning duct 1 has a top wall 16, a bottom wall 18 and side walls 12, 14 enclosing an interior space and at least one constriction 22, 24 formed by a projection protruding from at least one of the top wall 16 and the bottom wall 18 into the air-conditioning duct 1 so as to connect the top wall 16 with the bottom wall 18. The constriction 22, 24 continuously extends in an air flow direction so that cross-sectional areas of the constriction 22, 24 are constant in the air flow direction.

6 Claims, 3 Drawing Sheets

AIR-CONDITIONING DUCT FOR VEHICLE

REFERENCE TO RELATED APPLICATION

This is a continuation of International Patent Application No. PCT/JP02/107449, filed Jul. 23,2002.

BACKGROUND OF THE INVENTION

1. Field of the Invention

The present invention relates to a vehicle air-conditioning duct and in particular to a vehicle air-conditioning duct with an oblong cross-sectional configuration.

2. Description of the Related Art

An air-conditioning duct for delivering a stream of conditioned air from an air conditioner provided in a console of a vehicle to the rear seats thereof, for example, one for delivering warm air to a foot region of the rear seat area, is often provided in a floor section of the vehicle. The duct is given a laterally oblong cross-sectional shape because of the limited installation space (see FIG. 1). Therefore, when a load is applied vertically onto the duct, for example, when people in the vehicle step on the duct, the duct may be damaged (may collapse or break).

FIGS. 4 and 5 are respectively a plan view and a cross-sectional side view of an air-conditioning duct 40 of the prior art. As shown in FIGS. 4 and 5, a top wall 42 and a bottom wall 44 of the duct 40 are provided with recesses 46 to prevent the duct 40 from being damaged and to increase the structural strength thereof. When these recesses are viewed from the inside of the duct 40, they are seen as projections 48, 50. The projections 48 projecting from the top wall 42 and the projections 50 projecting from the bottom wall 44 contact each other. This further increases the structural strength of the duct 40.

However, the projections 48, 50 projecting into the duct increase the resistance to air flow in the duct 40. More specifically, as shown in FIG. 4, the area of the flow passage for the conditioned air stream flowing from upstream in the direction indicated by the arrow 52 is decreased by the projections 48, 50. After the stream passes the projections 48, 50, the area of the flow passage increases. The decrease and increase of the area of the flow passage increases the flow resistance. Strictly speaking, after the stream is divided into two parts by the projections 48, 50, the divided parts of the stream wrap around to the rear of the projections 48, 50 to join together again. At that time, the stream separates from the projections 48, 50 so that vortexes are generated at the rear of the projections 48, 50. These vortexes increase the flow resistance. Since a plurality of pairs of the projections 48, 50 are formed in the flow direction 52, the stream flowing through the duct 40 encounters them many times and the flow resistance increases each time.

Also, as shown in FIG. 4, the flow passage of the duct 40 usually includes sharp curves. Separation of the stream therefore occurs at the downstream side of an inner curved portion 54 of the duct 40 and the flow resistance increases accordingly.

SUMMARY OF THE INVENTION

It is therefore an object of the present invention to provide a vehicle air-conditioning duct that has improved structural strength and minimizes increase in flow resistance to the conditioned air stream.

To achieve the above-mentioned object, the present invention provides a vehicle air-conditioning duct having an oblong cross-sectional configuration that comprises a top wall, a bottom wall and side walls enclosing an interior space, and at least one constriction formed by a projection protruding from at least one of the top wall and the bottom wall into the interior space so as to connect the top wall with the bottom wall, the constriction extending continuously in an air flow direction so that a cross-sectional area of the constriction is constant in the air flow direction.

Although this vehicle air-conditioning duct has an oblong cross-sectional configuration that is weak in vertical structural strength, the structural strength is increased because the duct has the constriction or constrictions extending from the top wall to the bottom wall within the duct so as to connect the top wall with the bottom wall. Since the constriction extends continuously in the direction of air flow through the duct so that the cross-sectional area of the constriction is constant in the air flow direction, flow resistance to the air flowing through the duct ordinarily caused by repeated increase and decrease of the area of the flow passage in the duct can be restricted. That is, since the constriction extends continuously, the flow resistance to the air flowing through the duct that would be caused by vortexes occurring should the constriction extend discontinuously can be eliminated. Consequently, the pressure loss of the conditioned air stream flowing through the duct can be reduced and the flow rate thereof can be increased.

The air-conditioning duct preferably includes a curved portion and the constriction is formed in the curved portion.

In this vehicle air-conditioning duct, since the constriction is formed continuously in the flow direction at the curved portion of the duct, the conditioned air stream flowing over the inner curved portion is guided by the constriction to follow a small radius of curvature so that separation of the stream occurring at the downstream side of the inner curved portion can be restricted. Consequently, the pressure loss of the stream flowing through the duct can be further reduced and the decrease of the flow rate thereof is restricted so that the flow rate is greater than in a prior art air-conditioning duct.

The side walls of the air-conditioning duct are preferably a large-radius side wall and a small-radius side wall in the curved portion, and a distance between the small-radius side wall and the constriction is equal to or smaller than a distance between the large-radius side wall and the constriction.

Also preferably, the side walls of the air-conditioning duct are a large-radius side wall and a small-radius side wall in the curved portion, and two or more of the constrictions are formed spaced apart in a width direction, distances between adjacent pairs of the large-radius side wall, the constrictions and the small-radius side wall being equal or decreasing from the large-radius side wall toward the small-radius side wall.

In the vehicle air-conditioning ducts of these two configurations, the distance between the small-radius side wall and the adjacent constriction is smaller than the distance between the large-radius side wall and the adjacent constriction. This allows the effect of preventing separation of the conditioned air stream flowing on the small-radius side of the curved portion to be enhanced and enables the area of the flow passage of the stream flowing on the large-radius side of the curved portion to be increased so that the pressure loss can be effectively reduced.

DETAILED DESCRIPTION OF THE PREFERRED EMBODIMENT

An embodiment of an air-conditioning duct according to the present invention will now be explained with reference to the drawings.

Figure 1:
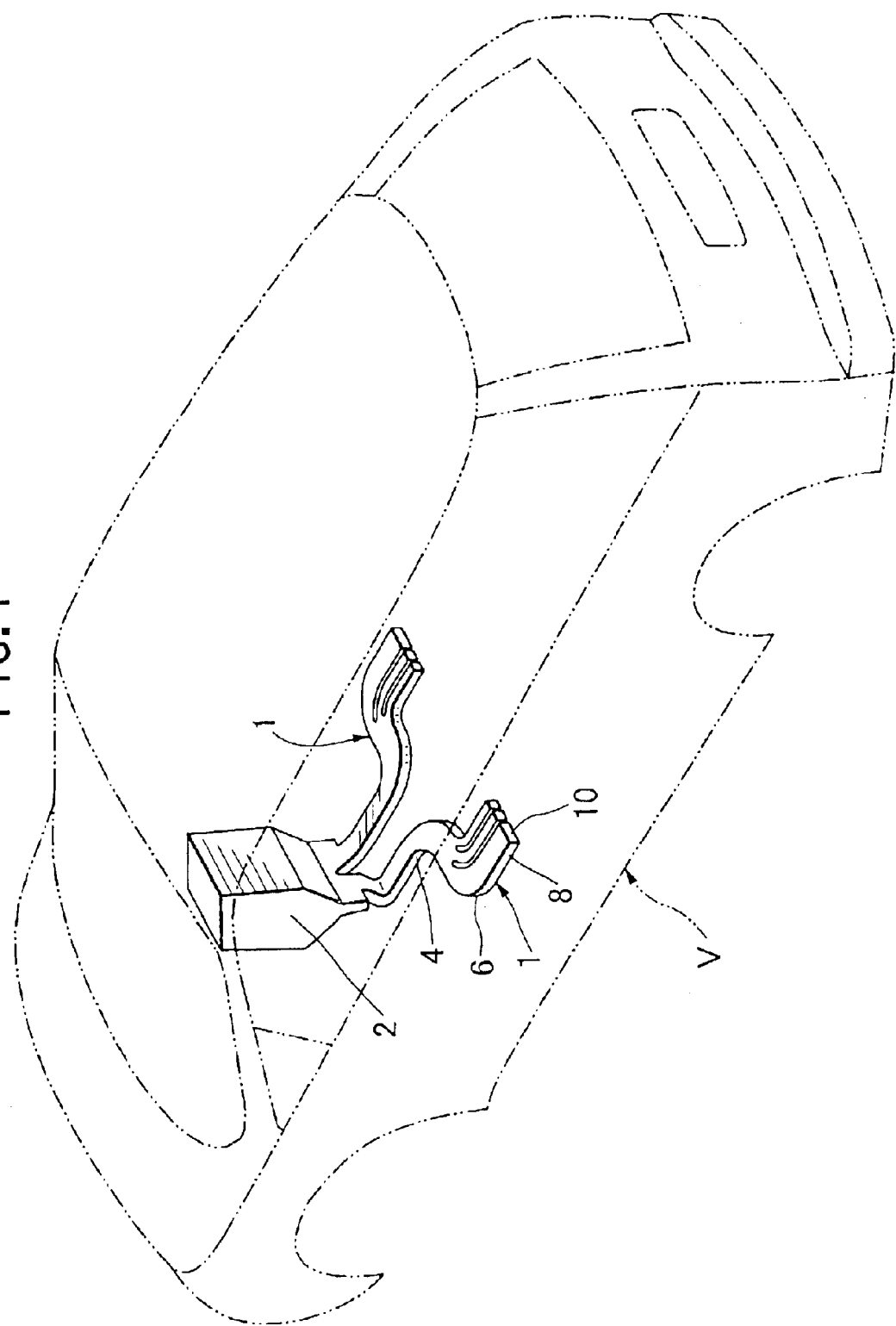
FIG. 1 is a perspective view of an air-conditioning duct installed in a vehicle that is an embodiment of the present invention.

FIG. 1 is a perspective view of an air-conditioning duct that is an embodiment according to the present invention. As shown in FIG. 1, two air-conditioning ducts 1 are provided to extend along the floor of a vehicle V from an air conditioner 2 installed at the lateral center of the vehicle V. Each air-conditioning duct includes a first curved portion 4 curved outwardly with respect to the vehicle V, a second curved portion 6 connected to the first curved portion 4 and curved rearward with respect to the vehicle V, and an air outlet 10 formed at a downstream end 8 displaced downstream from the second curved portion 6. Since the two air-conditioning ducts 1 are symmetrically installed on the left and right sides of the vehicle, only the left one will be explained in the following.

Figure 2:
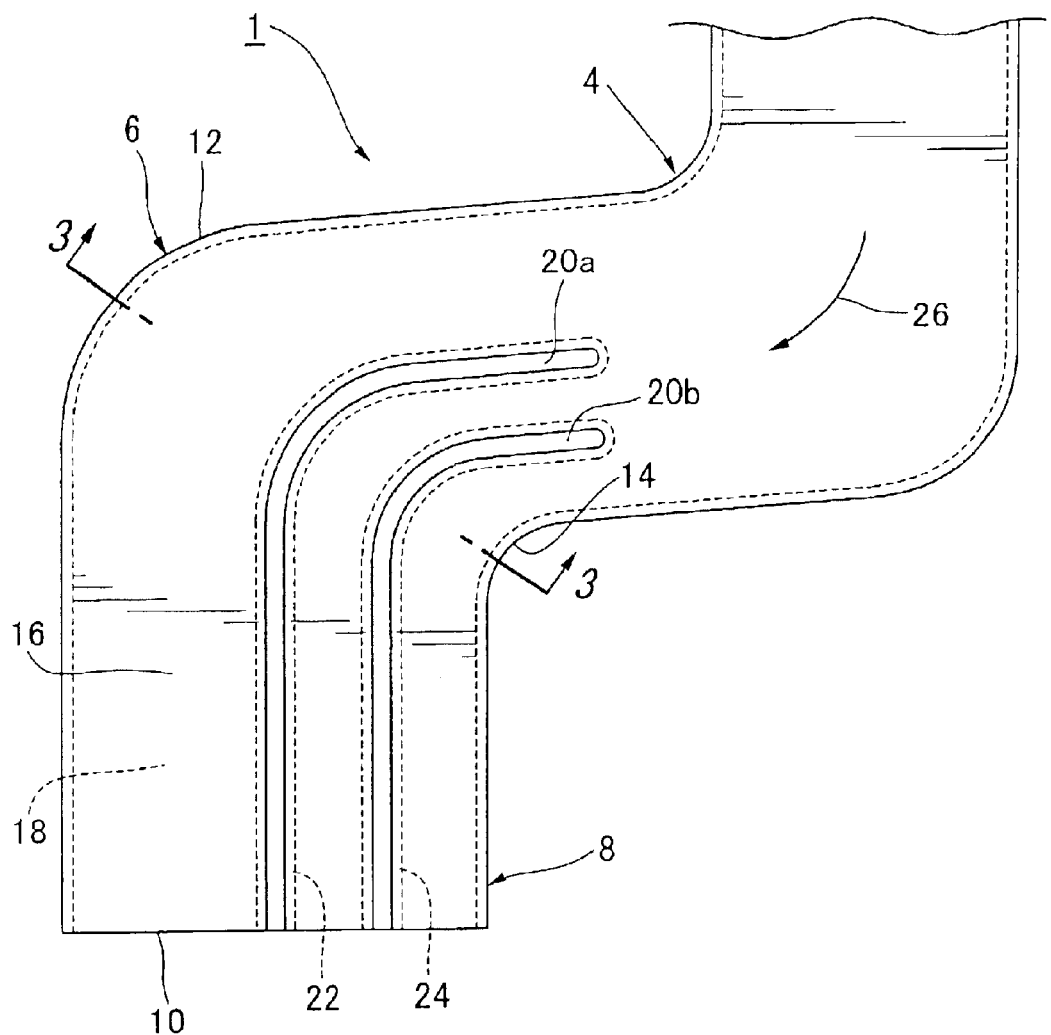
FIG. 2 is a plan view of the air-conditioning duct.
Figure 3:
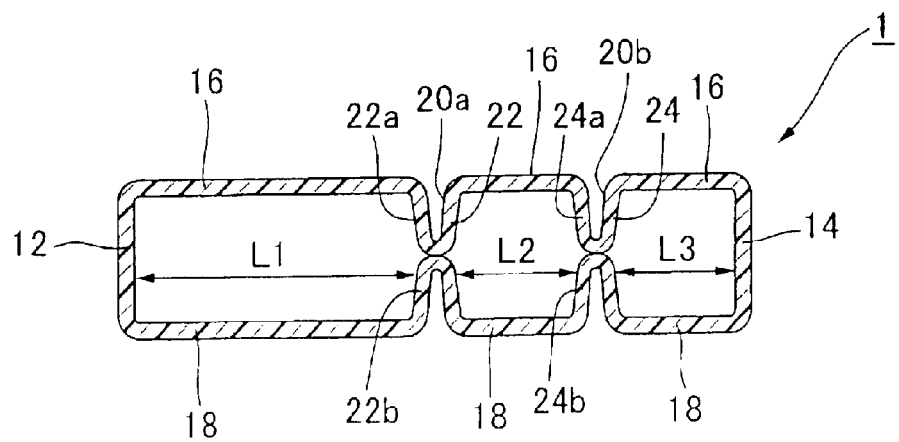
FIG. 3 is a cross-sectional view of the air-conditioning duct shown in FIG. 2 taken along line 3—3 thereof.
Figure 4:
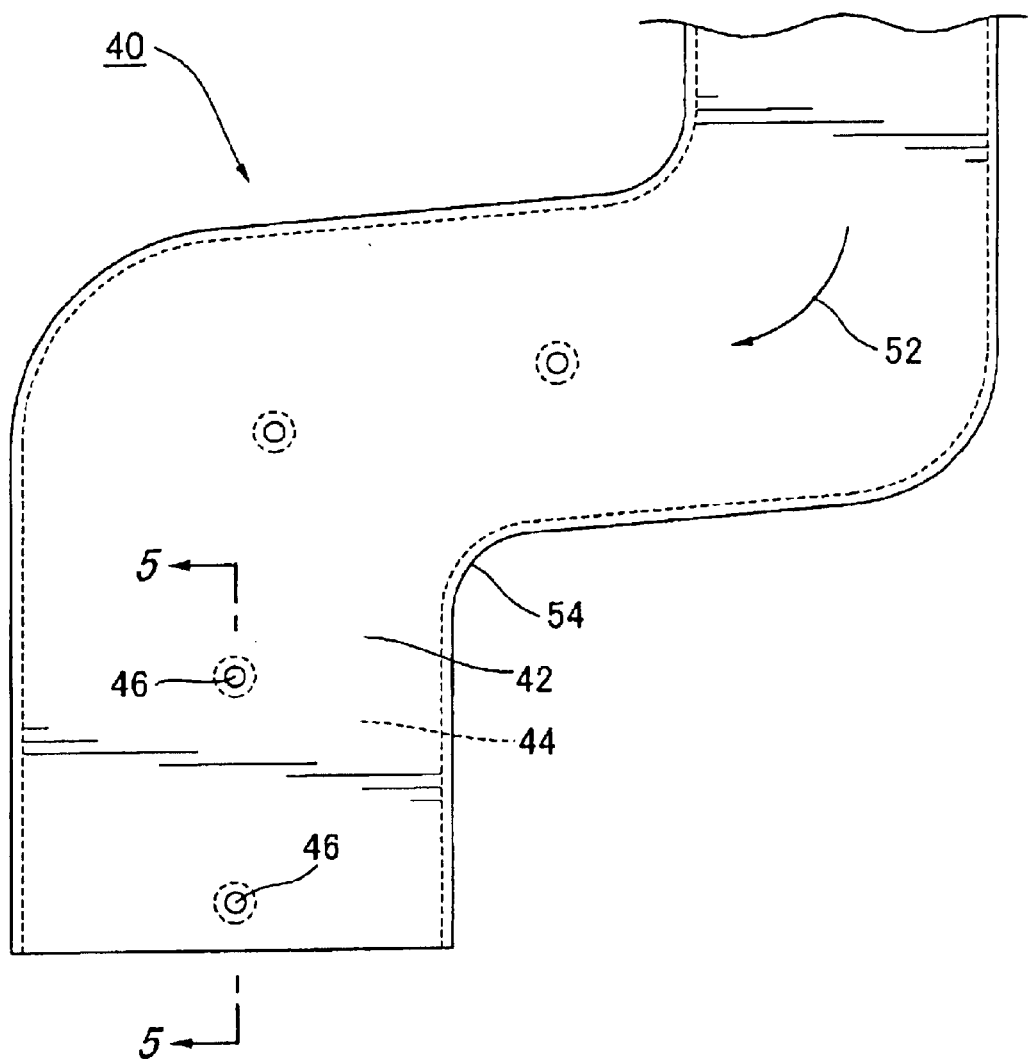
FIG. 4 is a plan view of an air-conditioning duct of the prior art.
Figure 5:
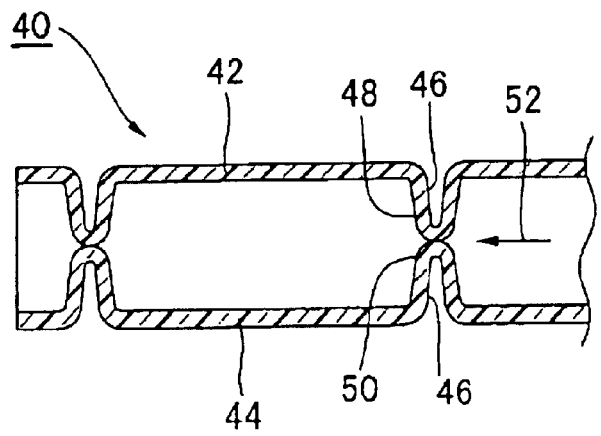
FIG. 5 is a cross-sectional view of the air-conditioning duct shown in FIG. 4 taken along line 5—5 thereof.

FIGS. 2 and 3 are respectively a plan view and a cross-sectional view of the duct 1. As shown in FIGS. 2 and 3, the second curved portion 6 of the duct 1 is provided with a large-radius side wall 12, a small-radius side wall 14, a top wall 16 and a bottom wall 18, and has a laterally oblong and rectangular cross-sectional configuration. The duct 1 is formed with two long recesses 20a, 20b extending longitudinally. The recesses 20a and 20b form an outer constriction 22 and an inner constriction 24 that bite into the duct 1. The outer constriction 22 is formed by a projection 22a projecting from the top wall 16 and a projection 22b projecting from the bottom wall 18. The inner constriction 24 is formed by a projection 24a projecting from the top wall 16 and a projection 24b projecting from the bottom wall 18. Both the projections 22a, 22b and the projections 24a, 24b may be connected with each other within the duct 1 either through a joint or simple contact. The connected constrictions 22, 24 increase vertical structural strength of the duct 1.

Further, as shown in FIG. 2, both the outer constriction 22 and the inner constriction 24 extend continuously along the duct 1 in the air flow direction 26. The cross-sectional areas of these constrictions 22, 24 are constant along the flow direction 26. Since the constrictions 22, 24 extend continuously along the flow direction 26, the structural strength of the duct 1 is increased.

As shown in FIG. 3, the distance L1 between the large-radius side wall 12 and the outer constriction 22, the distance L2 between the outer constriction 22 and the inner constriction 24, and the distance L3 between the inner constriction 24 and the small-radius side wall 14 are suitably defined to be equal or to decrease from the large-radius side wall 12 toward the small-radius side wall 14.

The conditioned air stream of air flowing through the duct 1 will now be explained.

As shown in FIG. 2, the conditioned air stream flows in the direction indicated by the arrow 26 and along the outer constriction 22 and the inner constriction 24 within the duct 1. Since the projections 22a, 24a protruding from the top wall 16 are connected with the projections 22b, 24b protruding from the bottom wall 18 and the constrictions 22, 24 formed thereby extend continuously in the flow direction so that the cross-sectional areas of the constrictions 22, 24 are constant along the flow direction, no vortexes are generated, which is different from what would be the case if the constrictions 22, 24 should extend discontinuously in the flow direction. This enables minimization of the increase in flow resistance to the conditioned air stream owing to generation of vortexes. Consequently, the pressure loss of the stream can be reduced and the flow rate of the conditioned air stream can be increased.

When the conditioned air stream subsequently flows along the curved portion 6 of the duct 1, the stream tends to separate from the small-radius side wall 14 on the downstream side thereof. However, since the duct 1 has the inner constriction 24, the stream flowing between the inner constriction 24 and the small-radius side wall 14 is guided by the inner constriction 24 to flow along the surface of the side wall. Thus, the separation of the conditioned air stream on the downstream side of the small-radius side wall of the curved portion 6 is restricted. Consequently, the pressure loss of the conditioned air stream flowing through the duct 1 can be further reduced and the flow rate of the conditioned air stream can be increased to greater than that in the air-conditioning duct of the prior art.

In the present embodiment, the distance L3 between the inner constriction 24 and the small-radius side wall 14 is preferably small enough to enhance the effect of guiding the conditioned air stream. On the other hand, since the radiuses of curvature of the passages for the conditioned air streams flowing between the large-radius side wall 12 and the outer constriction 22 and between the outer constriction 22 and the inner constriction 24 are relatively large, the distance L1 between the large-radius side wall 12 and the outer constriction 22 and the distance L2 between the outer constriction 22 and the inner constriction 24 are preferably larger than the distance L3 between the inner constriction 24 and the small-radius side wall 14. By making the distances L1 and L2 larger than the distance L3, the area of the steam passages become large to efficiently restrict increase in the flow resistance. Therefore, the outer constriction 22 and the inner constriction 24 of the duct 1 according to the present embodiment serve not only to increase the structural strength of the duct 1 but also to guide and thereby rectify the conditioned air stream.

Although one embodiment of an air-conditioning duct according to the present invention has been explained, the following modifications can be made.

Although a detailed explanation was given with respect to a configuration having the curved portion 6, the duct 1 and the constrictions 22, 24 may be straight. Further, the total area of the flow passage of the duct 1 may be gradually changed in the flow direction.

Although the constrictions 22, 24 are formed by projections protruding into the duct 1 from both the top wall 16 and bottom wall 18, each can instead be formed by a projection protruding from only one of the walls 16, 18 to the other.

Although the duct 1 has a rectangular cross-sectional configuration, it can instead have curved corners or an oval shape.

Although the embodiment described in the foregoing has two constrictions 22, 24, the number of constrictions can be one or three or more.

What is claimed is:

1. A vehicle air-conditioning duct having an oblong cross-sectional configuration, a first curved portion curved outwardly with respect to the vehicle, a second curved portion connected to the first curved portion and curved rearwardly with respect to the vehicle, and an air outlet formed at a downstream end displaced downstream from the second curved portion, said air-conditioning duct comprising:

a top wall, a bottom wall and side walls enclosing an interior space; and at least one constriction formed by first and second projections respectively protruding from the top wall and the bottom wall into the interior space so as to connect the top wall with the bottom wall, said first projection including a first recess protruding from the top wall into the interior space and formed integrally with the top wall, said second projection including a second recess protruding from the bottom wall into the interior space and formed integrally with the bottom wall, said constriction extending continuously in an air flow direction from downstream of the first curved portion to the outlet of the second curved portion to prevent separation of the air stream flowing in the curved portion of said air-conditioning duct and so that a cross-sectional area of the constriction is constant in the air flow direction.

2. The vehicle air-conditioning duct of claim 1, wherein said side walls include a first curved side wall portion along said curved portion having a relatively large radius of curvature and a second curved side wall portion along said curved portion having a relatively small radius of curvature, and wherein a distance between said second curved side wall portion and said constriction is equal to or smaller than a distance between said first curved side wall portion and said constriction.

3. The vehicle air-conditioning duct of claim 1, wherein said side walls include a first curved side wall portion along said curved portion having a relatively large radius of curvature and a second curved side wall portion along said curved portion having a relatively small radius of curvature, wherein said at least one constriction comprises two or more constrictions that are spaced apart in a width direction between said first curved side wall portion and said second curved side wall portion, and wherein distances between adjacent ones of said first curved side wall portion, said two or more constrictions, and said second curved side wall portion are equal to each other or decrease from said first curved side wall portion toward said second curved side wall portion.

4. A vehicle air-conditioning duct comprising:

a top wall, a bottom wall and side walls enclosing an interior space that extends in an airflow direction, wherein said top wall, said bottom wall and said side walls form an oblong cross-sectional configuration and a curved portion that curves in said airflow direction; and at least one constriction formed by first and second projections respectively protruding from at least one of said top wall and said bottom wall into said interior space so as to connect said top wall with said bottom wall, said first projection including a first recess protruding from the top wall into the interior space and formed integrally with the top wall, said second projection including a second recess protruding from the bottom wall into the interior space and formed integrally with the bottom wall, said constriction extending continuously in said airflow direction and along said curved portion to prevent separation of the air stream flowing in said curved portion, and said constriction having a cross-sectional area that is constant in said airflow direction.

5. The vehicle air-conditioning duct of claim 4, wherein said side walls include a first curved side wall portion along said curved portion having a relatively large radius of curvature and a second curved side wall portion along said curved portion having a relatively small radius of curvature, and wherein a distance between said second curved side wall portion and said constriction is equal to or smaller than a distance between said first curved side wall portion and said constriction.

6. The vehicle air-conditioning duct of claim 4, wherein said side walls include a first curved side wall portion along said curved portion having a relatively large radius of curvature and a second curved side wall portion along said curved portion having a relatively small radius of curvature, wherein said at least one constriction comprises two or more constrictions that are spaced apart in a width direction between said first curved side wall portion and said second curved side wall portion, and wherein distances between adjacent ones of said first curved side wall portion, said two or more constrictions, and said second curved side wall portion are equal to each other or decrease from said first curved side wall portion toward said second curved side wall portion.

* * * * *